(12) United States Patent
Kitagawa et al.

(10) Patent No.: US 12,104,014 B2
(45) Date of Patent: Oct. 1, 2024

(54) POLYCARBONATE RESIN COMPOSITION AND MOLDED BODY OF SAME

(71) Applicant: SUMITOMO CHEMICAL COMPANY, LIMITED, Tokyo (JP)

(72) Inventors: Sho Kitagawa, Ichihara (JP); Mitsuhiro Okada, Ichihara (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 547 days.

(21) Appl. No.: 17/056,577

(22) PCT Filed: May 22, 2019

(86) PCT No.: PCT/JP2019/020308
§ 371 (c)(1),
(2) Date: Nov. 18, 2020

(87) PCT Pub. No.: WO2019/225659
PCT Pub. Date: Nov. 28, 2019

(65) Prior Publication Data
US 2021/0253789 A1    Aug. 19, 2021

(30) Foreign Application Priority Data
May 23, 2018    (JP) ................................. 2018-098849

(51) Int. Cl.
*C08G 64/04*    (2006.01)
*C08G 63/183*    (2006.01)
(Continued)

(52) U.S. Cl.
CPC ............ *C08G 64/04* (2013.01); *C08G 63/183* (2013.01); *C08L 23/04* (2013.01); *C08L 63/00* (2013.01);
(Continued)

(58) Field of Classification Search
CPC ............ C08L 2205/035; C08L 2203/30; C08L 63/00; C08L 23/04; C08G 63/183; C08G 64/04
(Continued)

(56) References Cited

U.S. PATENT DOCUMENTS

2015/0079324 A1  3/2015  Nii
2016/0060456 A1  3/2016  Imada et al.
2017/0114218 A1  4/2017  Imada

FOREIGN PATENT DOCUMENTS

CN    102652152 A     8/2012
CN    104169365 A    11/2014
(Continued)

OTHER PUBLICATIONS

International Preliminary Report on Patentability dated Nov. 24, 2020 for corresponding International Patent Application No. PCT/JP2019/020308.
(Continued)

*Primary Examiner* — David T Karst
(74) *Attorney, Agent, or Firm* — Foley & Lardner LLP

(57) ABSTRACT

Disclosed is a polycarbonate resin composition containing (a) an aromatic polycarbonate, (b) a polyester, and (c) a polymer having an epoxy group. The following requirements are satisfied.
(1) A content of the (a) aromatic polycarbonate is 75% by mass or more based on a mass of the polycarbonate resin composition.
(2) A mass ratio of a content of the (c) polymer having an epoxy group with respect to a content of the (b) polyester is 0.8 or more.
(3) A content of a sum of the (b) polyester and the (c) polymer having an epoxy group is 25 parts by mass or less with respect to 100 parts by mass of the (a) aromatic polycarbonate.

4 Claims, 1 Drawing Sheet

(51) Int. Cl.
*C08L 23/04* (2006.01)
*C08L 63/00* (2006.01)

(52) U.S. Cl.
CPC ..... *C08L 2203/30* (2013.01); *C08L 2205/035* (2013.01)

(58) Field of Classification Search
USPC ........................................................ 528/196
See application file for complete search history.

(56) References Cited

FOREIGN PATENT DOCUMENTS

| | | |
|---|---|---|
| CN | 106032430 A | 10/2016 |
| JP | S61-252268 A | 11/1986 |
| JP | H11-116782 A | 4/1999 |
| JP | 2893185 A | 5/1999 |
| JP | 2000-159994 A | 6/2000 |
| JP | 2004-143282 A | 5/2004 |
| JP | 2005-054033 A | 3/2005 |
| JP | 2008-088334 A | 4/2008 |
| JP | 2012-077240 A | 4/2012 |
| JP | 2012-077241 A | 4/2012 |
| JP | 2014-001374 A | 1/2014 |
| JP | 2017-082062 A | 5/2017 |

OTHER PUBLICATIONS

International Search Report dated Jul. 30, 2019 for corresponding International Patent Application No. PCT/JP2019/020308.
Office Action issued in connection with EP Appl. Ser. No. 19807200.1 dated Oct. 6, 2022.
European Extended Search Report, dated Jan. 12, 2022, issued in counterpart European Patent Application No. 19807200.1, (6 pages).
First Chinese Office Action issued in corresponding CN Appl. Ser. No. 201980033708.8 dated May 30, 2022 (14 pages).

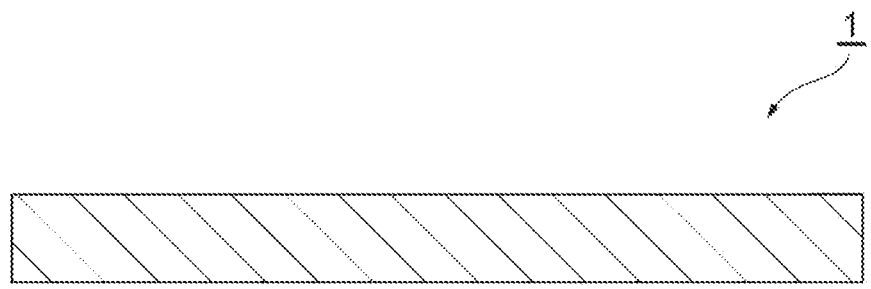

POLYCARBONATE RESIN COMPOSITION AND MOLDED BODY OF SAME

CROSS-REFERENCE TO RELATED APPLICATIONS

The present application claims priority under 37 U.S.C. § 371 to International Patent Application No. PCT/JP2019/020308, filed May 22, 2019, which claims priority to and the benefit of Japanese Patent Application No. 2018-098849, filed on May 23, 2018. The contents of these applications are hereby incorporated by reference in their entireties.

TECHNICAL FIELD

The present invention relates to a polycarbonate resin composition and a molded body thereof.

BACKGROUND ART

In order to improve the impact resistance of a resin composition containing an aromatic polycarbonate, for example, a copolymer composed mainly of an α-olefin and a glycidyl ester of an α,β-unsaturated acid may be incorporated into the resin composition (for example, Patent Document 1).

CITATION LIST

Patent Literature

Patent Document 1: Japanese Patent No. 2893185

SUMMARY OF INVENTION

Technical Problem

A polycarbonate resin composition containing an aromatic polycarbonate as a main component may lack scratch restorability and hydrolysis resistance. Furthermore, further enhancement of impact resistance is also desired. These characteristics tend to be improved by, for example, incorporation of a soft resin; however, in that case, the elastic modulus tends to be easily decreased to a large extent.

An object of an aspect of the present invention is to improve the impact resistance, scratch restorability, and hydrolysis resistance of a polycarbonate resin composition containing an aromatic polycarbonate as a main component, while maintaining a relatively high elastic modulus.

Solution to Problem

An aspect of the present invention provides a polycarbonate resin composition containing:
(a) an aromatic polycarbonate;
(b) a polyester; and
(c) a polymer having an epoxy group.
This polycarbonate resin composition satisfies the following requirements:
 (1) a content of the (a) aromatic polycarbonate is 75% by mass or more based on a mass of the polycarbonate resin composition;
 (2) a mass ratio of a content of the (c) polymer having an epoxy group with respect to a content of the (b) polyester is 0.8 or more; and
 (3) a content of a sum of the (b) polyester and the (c) polymer having an epoxy group is 25 parts by mass or less with respect to 100 parts by mass of the (a) aromatic polycarbonate.

Another aspect of the present invention provides a molded body formed by molding the polycarbonate resin composition.

The polycarbonate resin composition and the molded body can have excellent impact resistance, scratch restorability, and hydrolysis resistance while maintaining an appropriately high elastic modulus.

Advantageous Effects of Invention

The present invention can provide a polycarbonate resin composition having excellent impact resistance, scratch restorability, and hydrolysis resistance while maintaining an appropriately high elastic modulus, and a molded body of the polycarbonate resin composition.

BRIEF DESCRIPTION OF DRAWINGS

The FIGURE is a cross-sectional view illustrating an embodiment of a molded body.

DESCRIPTION OF EMBODIMENTS

Hereinafter, several embodiments of the present invention will be described in detail. However, the present invention is not intended to be limited to the following embodiments.

A polycarbonate resin composition according to an embodiment is a thermoplastic resin composition containing: (a) an aromatic polycarbonate, (b) a polyester, and (c) a polymer having an epoxy group.

The polycarbonate resin composition according to an embodiment satisfies the following requirements of (1), (2), and (3).
 (1) A content of the (a) aromatic polycarbonate is 75% by mass or more based on a mass of the polycarbonate resin composition.
 (2) A mass ratio of a content of the (c) polymer having an epoxy group with respect to a content of the (b) polyester is 0.8 or more.
 (3) A content of a sum of the (b) polyester and the (c) polymer having an epoxy group is 25 parts by mass or less with respect to 100 parts by mass of the (a) aromatic polycarbonate.

By a combination of the requirements (1), (2), and (3), the polycarbonate resin composition according to the present embodiment can have excellent impact resistance, scratch restorability, and hydrolysis resistance while maintaining an appropriately high elastic modulus.

According to one point of view, requirement (1) means that the polycarbonate resin composition contains an aromatic polycarbonate as a main component. When the content of the aromatic polycarbonate is 75% by mass or more, the polycarbonate resin composition and a molded body thereof can easily maintain an appropriately high elastic modulus. The tensile modulus of the polycarbonate resin composition may be, for example, 1300 MPa or higher, 1400 MPa or higher, or 1500 MPa or higher. From the viewpoint of maintaining such an elastic modulus, the content of the aromatic polycarbonate may also be 80% by mass or more based on the mass of the polycarbonate resin composition. Particularly, the content of the (a) aromatic polycarbonate may be 80% by mass or more based on the mass of the polycarbonate resin composition when the polycarbonate resin composition does not contain (d) an ethylene-based polymer that will be described below, and may be 75% by mass or more based on the mass of the polycarbonate resin composition in a case in which the polycarbonate resin composition contains the (d) ethylene-based polymer. The content of the aromatic polycarbonate may be 98% by mass or less based on the mass of the polycarbonate resin composition.

The mass ratio ((c)/(b)) of the content of the (c) polymer having an epoxy group with respect to the content of the (b) polyester of requirement (2) may be more than 1.0, and may be more than 2.0, from the viewpoints of hydrolysis resistance and impact resistance. Particularly, when the polycarbonate resin composition does not contain the (d) ethylene-based polymer that will be described below, (c)/(b) may be more than 1.0 and may be more than 2.0. The upper limit of (c)/(b) is not particularly limited; however, the upper limit may be, for example, 20 or less, 15 or less, or 10 or less.

The content ((b)+(c)) of the sum of the (b) polyester and the (c) polymer having an epoxy group of requirement (3) may be 20 parts by mass or less, 18 parts by mass or less, or 12 parts by mass or less and may be 1.0 part by mass or more, 2.0 parts by mass or more, or 3.0 parts by mass or more, with respect to 100 parts by mass of the (a) aromatic polycarbonate, from the viewpoint of maintaining a high elastic modulus.

The respective contents of the (b) polyester and the (c) polymer having an epoxy group are adjusted such that the requirements (1), (2), and (3) are satisfied. For example, the content of the (b) polyester may be 0.01 parts by mass or more, 0.5 parts by mass or more, or 1 part by mass or more, and may be 13 parts by mass or less, 12.5 parts by mass or less, 10 parts by mass or less, 7 parts by mass or less, or 5 parts by mass or less, with respect to 100 parts by mass of the aromatic polycarbonate. The content of the (c) polymer having an epoxy group may be 0.1 parts by mass or more, 0.5 parts by mass or more, or 1 part by mass or more, and may be 24 parts by mass or less, or 20 parts by mass or less.

The polycarbonate resin composition according to an embodiment may further contain (d) an ethylene-based polymer. With the combination of the (b) polyester, the (c) polymer having an epoxy group, and the (d) ethylene-based polymer, the impact resistance and hydrolysis resistance of the polycarbonate resin composition and a molded body thereof are specifically further improved.

From the viewpoints of impact resistance and elastic modulus, the content of the (d) ethylene-based polymer may be 0.1 parts by mass or more, 1 part by mass or more, 2 parts by mass or more, or 3 parts by mass or more, and may be 32 parts by mass or less, 30 parts by mass or less, 20 parts by mass or less, or 10 parts by mass or less, with respect to 100 parts by mass of the aromatic polycarbonate.

In the following description, the details of the various components constituting the polycarbonate resin composition will be described.

The (a) aromatic polycarbonate is a polymer which includes a monomer unit derived from an aromatic dihydroxy compound, and a carbonyl group, and may be linear or branched. The aromatic polycarbonate is generally produced by a polymerization reaction between an aromatic dihydroxy compound and carbonyl chloride (phosgene), a carbonic acid diester (for example, dimethyl carbonate, diphenyl carbonate), carbon monoxide, or carbon dioxide.

Examples of the aromatic dihydroxy compound that constitutes the aromatic polycarbonate include a bis(hydroxyaryl)alkane, a bis(hydroxyaryl)cycloalkane, a cardo structure-containing bisphenol, a dihydroxy diaryl ether, a dihydroxy diaryl sulfide, a dihydroxy diaryl sulfoxide, a dihydroxy diaryl sulfone, 4,4'-dihydroxydiphenyl, hydroquinone, resorcin, and combinations thereof.

Examples of the bis(hydroxyaryl)alkane include 2,2-bis(4-hydroxyphenyl)propane, 2,2-bis(3,5-dibromo-4-hydroxyphenyl)propane, bis(4-hydroxyphenyl)methane, 1,1-bis(4-hydroxyphenyl)ethane, 2,2-bis(4-hydroxyphenyl)butane, 2,2-bis(4-hydroxyphenyl)octane, 2,2-bis(4-hydroxy-3-methylphenyl)propane, 1,1-bis(3-tert-butyl-4-hydroxyphenyl)propane, 2,2-bis(4-hydroxy-3,5-dimethylphenyl)propane, 2,2-bis(3-bromo-4-hydroxyphenyl)propane, 2,2-bis(3,5-dichloro-4-hydroxyphenyl)propane, 2,2-bis(3-phenyl-4-hydroxyphenyl)propane, 2,2-bis(3-cyclohexyl-4-hydroxyphenyl)propane, 1,1-bis(4-hydroxyphenyl)-1-phenylethane, bis(4-hydroxyphenyl)diphenylmethane, 2,2-bis(4-hydroxyphenyl)-1,1,1-trichloropropane, 2,2-bis(4-hydroxyphenyl)-1,1,1,3,3,3-hexachloropropane, 2,2-bis(4-hydroxyphenyl)-1,1,1,3,3,3-hexafluoropropane, 1,1-bis(4-hydroxy-3-tert-butylphenyl)propane, 2,2-bis(4-hydroxy-3-bromophenyl)propane, and 2,2-bis(4-hydroxy-3,5-dibromophenyl)propane. 2,2-Bis(4-hydroxyphenyl)propane and 2,2-bis(3,5-dibromo-4-hydroxyphenyl)propane are also referred to as bisphenol A and tetrabromobisphenol A, respectively.

Examples of the bis(hydroxyaryl)cycloalkane include 1,1-bis(4-hydroxyphenyl)cyclopentane, 1,1-bis(4-hydroxyphenyl)cyclohexane, and 1,1-bis(4-hydroxyphenyl)-3,3,5-trimethylcyclohexane.

Examples of the cardo structure-containing bisphenol include 9,9-bis(4-hydroxyphenyl)fluorene and 9,9-bis(4-hydroxy-3-methylphenyl)fluorene.

Examples of the dihydroxy diaryl ether include 4,4'-dihydroxy diphenyl ether and 4,4'-dihydroxy-3,3'-dimethyl diphenyl ether.

Examples of the dihydroxy diaryl sulfide include 4,4'-dihydroxy diphenyl sulfide and 4,4'-dihydroxy-3,3'-dimethyl diphenyl sulfide.

Examples of the dihydroxy diaryl sulfoxide include 4,4'-dihydroxy diphenyl sulfoxide and 4,4'-dihydroxy-3,3'-dimethyl diphenyl sulfoxide.

Examples of the dihydroxy diaryl sulfone include 4,4'-dihydroxy diphenyl sulfone and 4,4'-dihydroxy-3,3'-dimethyl diphenyl sulfone.

The aromatic polycarbonate may include a monomer unit derived from one kind or two or more kinds of aromatic dihydroxy compounds selected from these. The aromatic polycarbonate may include a monomer unit derived from 2,2-bis(4-hydroxyphenyl)propane in particular.

A branched aromatic polycarbonate includes, for example, monomer units derived from fluoroglycine; a polyhydroxy compound such as 2,6-dimethyl-2,4,6-tris(4-hydroxyphenyl)-3-heptene, 4,6-dimethyl-2,4,6-tris(4-hydroxyphenyl)-2-heptene, 1,3,5-tris(2-hydroxyphenyl)benzol, 1,1,1-tris(4-hydroxyphenyl)ethane, 2,6-bis(2-hydroxy-5-methylbenzyl)-4-methylphenol, and α,α',α''-tris(4-hydroxyphenyl)-1,3,5-triisopropylbenzene; or 3,3-bis(4-hydroxyaryl)oxindole (isatin bisphenol), 5-chloroisatin bisphenol, 5,7-dichloroisatin bisphenol, or 5-bromoisatin bisphenol.

The viscosity average molecular weight of the aromatic polycarbonate may be 10000 to 100000. The viscosity average molecular weight as used herein is a value calculated relative from the melt viscosity, which is measured at a temperature of 20° C. using methylene chloride as a solvent.

The aromatic polycarbonate can be synthesized by a conventional method such as an interface polymerization method, a pyridine method, a transesterification method. A commercially available product of the aromatic polycarbonate can also be used.

The (b) polyester may be particularly an aromatic polyester which is a polycondensation reaction product of an aromatic dicarboxylic acid and a saturated dihydric alcohol. Examples of the aromatic polyester include polyethylene terephthalate, polypropylene terephthalate, polytetramethylene terephthalate (also referred to as "polybutylene terephthalate"), polyhexamethylene terephthalate, polycyclohexane-1,4-dimethylol terephthalate, and polyneopentyl terephthalate.

From the viewpoints of the hydrolysis resistance, scratch restorability, and the like of the polycarbonate resin composition and the molded body, the (b) polyester may include polybutylene terephthalate, polyethylene terephthalate, or a combination of these. Polybutylene terephthalate may further include a monomer unit derived from an aromatic dicarboxylic acid other than terephthalic acid, and examples thereof include polybutylene (terephthalate/adipate), polybutylene (terephthalate/sebacate), polybutylene (terephthalate/decanedicarboxylate), polybutylene (terephthalate/naphthalate), and poly(butylene/ethylene) terephthalate. Polyethylene terephthalate may further include a monomer unit derived from an aromatic dicarboxylic acid other than terephthalic acid, and examples thereof include polyethylene (terephthalate/adipate), polyethylene (terephthalate/sebacate), polyethylene (terephthalate/decanedicarboxylate), polyethylene (terephthalate/naphthalate), and poly(butylene/ethylene) terephthalate.

The intrinsic viscosity of the polyester may be 0.50 to 2.00 dl/g. The intrinsic viscosity as used herein is a value that can be determined by measuring the viscosity of a solution in which the polyester is dissolved in a mixed solvent of phenol and tetrachloroethane (mass ratio 5: 5), at 30° C.

The polyester can be synthesized by, for example, a conventional polymerization method using an aromatic dicarboxylic acid and a saturated dihydric alcohol. A commercially available product of the polyester can also be used.

The (c) polymer having an epoxy group is generally a thermoplastic resin and may be, for example, a copolymer including a monomer unit derived from a monomer having an epoxy group.

Examples of the monomer having an epoxy group include an α,β-unsaturated carboxylic acid glycidyl ester and a glycidyl ether having an unsaturated group.

The unsaturated carboxylic acid glycidyl ester may be a compound represented by the following formula (1). In formula (1), $R^1$ represents an alkenyl group having 2 to 18 carbon atoms, which may have one or more substituents. Examples of the compound represented by formula (1) include glycidyl acrylate, glycidyl methacrylate, and itaconic acid glycidyl ester.

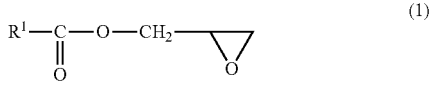
(1)

The glycidyl ether having an unsaturated group may be a compound represented by the following formula (2). In formula (2), $R^2$ represents an alkenyl group having 2 to 18 carbon atoms, which may have one or more substituents, and X represents $CH_2$—O ($CH_2$ is bonded to $R^2$) or an oxygen atom. Examples of the compound represented by formula (2) include allyl glycidyl ether, 2-methylallyl glycidyl ether, and styrene-p-glycidyl ether.

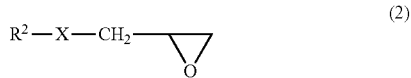
(2)

Examples of a copolymerization monomer that is copolymerized with the monomer having an epoxy group include ethylene, an α-olefin, styrene, acrylonitrile, an unsaturated carboxylic acid ester (ethyl acrylate, methyl methacrylate, butyl acrylate, or the like), acrylic acid, an unsaturated vinyl ester (vinyl acetate, vinyl propionate, or the like), or combinations of these.

The polymer having an epoxy group may be an olefin-based copolymer including a monomer unit having an epoxy group and a monomer unit derived from ethylene or an α-olefin (propylene or the like). The proportion of the monomer unit derived from ethylene or an α-olefin (proportion of a sum of a monomer unit derived from ethylene and a monomer unit derived from an α-olefin) may be 50% to 99.9% by mass based on the mass of the polymer having an epoxy group.

Examples of the olefin-based copolymer having an epoxy group include an ethylene-glycidyl (meth)acrylate copolymer, an ethylene-glycidyl (meth)acrylate-methyl (meth)acrylate copolymer, an ethylene-glycidyl (meth)acrylate-ethyl (meth)acrylate copolymer, an ethylene-glycidyl (meth)acrylate-normal propyl (meth)acrylate copolymer, an ethylene-glycidyl (meth)acrylate-isopropyl (meth)acrylate copolymer, an ethylene-glycidyl (meth)acrylate-normal butyl (meth)acrylate copolymer, an ethylene-glycidyl (meth)acrylate-isobutyl (meth)acrylate copolymer, an ethylene-glycidyl (meth)acrylate-2-ethylhexyl (meth)acrylate copolymer, and an ethylene-glycidyl (meth)acrylate-vinyl acetate copolymer. Particularly, an ethylene-glycidyl (meth)acrylate copolymer may be selected. As an example of a commercially available product of an ethylene-glycidyl (meth)acrylate copolymer, "BONDFAST" (trade name) manufactured by Sumitomo Chemical Co., Ltd. is available.

Other examples of the copolymer including a monomer unit having an epoxy group include a glycidyl methacrylate-styrene copolymer, a glycidyl methacrylate-acrylonitrile-styrene copolymer, and a glycidyl methacrylate-propylene copolymer.

The polymer having an epoxy group may have a polymer chain comprising polyethylene, polypropylene, polystyrene, an ethylene-α-olefin copolymer, or a hydrogenated or non-hydrogenated styrene-conjugated diene-based polymer; and a graft chain bonded to this polymer chain, the graft chain including a monomer having an epoxy group. The monomer having an epoxy group can be graft-polymerized by, for example, solution- or melt-kneading.

The proportion of the monomer unit having an epoxy group in the polymer having an epoxy group may be 0.1% by mass or more, 0.5% by mass or more, 1% by mass or more, or 3% by mass or more, based on the mass of the polymer having an epoxy group. The proportion of the monomer unit having an epoxy group may be 30% by mass or less, 20% by mass or less, 15% by mass or less, or 10% by mass or less, based on the mass of the polymer having an epoxy group, and may be more than 6% by mass. When the proportion of the monomer unit having an epoxy group is high, the hydrolysis resistance of the polycarbonate resin composition and the molded body tends to be further enhanced.

Examples of a method for producing a polymer having an epoxy group include a method of copolymerizing a monomer having an epoxy group with another monomer by a high-pressure radical polymerization method, a solution polymerization method, an emulsion polymerization method, or the like; a method of graft-polymerizing a monomer having an epoxy group into an ethylene-based polymer or the like; and the like.

The (d) ethylene-based polymer is a polymer that does not have an epoxy group and is a homopolymer or a copolymer, which includes a monomer unit derived from ethylene as a main monomer unit. The proportion of the monomer unit derived from ethylene in the ethylene-based polymer is typically more than 50% by mass based on the mass of the ethylene-based polymer. The ethylene-based polymer may be a low-density polyethylene, a linear low-density polyethylene, a linear very low-density polyethylene, a medium-density polyethylene, or a high-density polyethylene.

The density of the ethylene-based polymer may be less than $0.930 \text{ g/cm}^3$, $0.900 \text{ g/cm}^3$ or less, or $0.870 \text{ g/cm}^3$ or less, from the viewpoints of the hydrolysis resistance, scratch restorability, and the like of the polycarbonate resin composition and the molded body. The lower limit of the density of the ethylene-based polymer is not particularly limited; however, the lower limit is usually $0.855 \text{ g/cm}^3$ or more.

The (d) ethylene-based polymer may be a copolymer of ethylene and one or more kinds of co-monomers selected from the group consisting of an α-olefin, a vinyl ester, an unsaturated carboxylic acid ester and an ionomer thereof, a vinyl aromatic compound, a diene compound, and a cyclic olefin, or a hydrogenation product of the copolymer. Examples of the α-olefin include propylene, butene-1, pentene-1, hexene-1, heptene-1, octene-1, nonene-1, decene-1, undecene-1, dodecene-1, tridecene-1, tetradecene-1, pentadecene-1, hexadecene-1, heptadecene-1, octadecene-1, nonadecene-1, eicosene-1, 3-methyl-1-butene, 3-methyl-1-pentene, 3-ethyl-1-pentene, 4-methyl-1-pentene, 4-methyl-1-hexene, 4,4-dimethyl-1-hexene, 4,4-dimethyl-1-pentene, 4-ethyl-1-hexene, 3-ethyl-1-hexene, 9-methyl-1-decene, 11-methyl-1-dodecene, and 12-ethyl-1-tetradecene. Examples of the vinyl ester include vinyl acetate and vinyl propionate. Examples of the unsaturated carboxylic acid ester include methyl acrylate, ethyl acrylate, methyl methacrylate, and ethyl methacrylate. Examples of the vinyl aromatic compound include styrene and α-methylstyrene. Examples of the diene compound include butadiene, isoprene, 1,3-pentadiene, and 2,5-norbornadiene. Examples of the cyclic olefin include 2-norbornene and 5-methyl-2-norbornene.

The (d) ethylene-based polymer may be an ethylene-α-olefin copolymer, from the viewpoints of the impact resistance, hydrolysis resistance, and the like of the polycarbonate resin composition and the molded body. The number of carbon atoms of the α-olefin may be 3 to 8. The proportion of the monomer unit derived from an α-olefin in the ethylene-α-olefin copolymer may be 4 mol % to 25 mol %, 7 mol % to 25 mol %, or 12 mol % to 22 mol %, based on the entirety of the monomer units that constitute the ethylene-α-olefin copolymer.

The (d) ethylene-based polymer can be synthesized by, for example, a conventional polymerization method using a catalyst for olefin polymerization. A commercially available product of the ethylene-based polymer can also be used.

The polycarbonate resin composition according to an embodiment can further contain other components, in addition to the component (a), component (b), and component (c) described above as well as the component (d) that is optionally used, to the extent that the purport of the present invention is maintained. Examples of the other components include various additives such as a thermal stabilizer, an oxidation inhibitor, a colorant, a mold release agent, a softening agent, an antistatic agent, an impact resistance improver, a filler, a lubricating agent, a dye, and a flame retardant. The polycarbonate resin composition may further contain a polymer other than the component (a), component (b), component (c), and component (d). In the case of a polycarbonate resin composition that is used for use applications where the degree of important of flame retardancy is not high, the content of the flame retardant may be 0 to 20 parts by mass, and the content of a sum of the (b) polyester, the (c) polymer having an epoxy group, and the flame retardant may be less than 25 parts by mass with respect to 100 parts by mass of the (a) aromatic polycarbonate.

The content of Ti (titanium) in the polycarbonate resin composition may be 0.01 to 30 ppm based on the mass of the polycarbonate resin composition. When the content of Ti is in this range, the hydrolysis resistance and scratch restorability of the polycarbonate resin composition and the molded body tend to be further enhanced. Ti may be, for example, a trace component derived from a polymerization catalyst for polyester.

The polycarbonate resin composition can be obtained by, for example, a method including melt-kneading various components. The polycarbonate resin composition may be in a pellet form.

The FIGURE is a cross-sectional view illustrating an embodiment of a molded body of a polycarbonate resin composition. The molded body 1 comprising the polycarbonate resin composition can be produced by, for example, a method including molding a polycarbonate resin composition in a pellet form into a desired shape by conventional means such as injection molding. The shape of the molded body is not particularly limited. The molded body can be used for use applications such as, for example electric and electronic equipment, communication equipment, precision machines, and automotive parts.

EXAMPLES

Hereinafter, the present invention will be described more specifically by way of Examples. However, the present invention is not intended to be limited to these Examples.

1. Raw Materials

The following were prepared as raw materials for preparing a polycarbonate resin composition.

(a) Aromatic polycarbonate
  PC: SD POLYCA 200-13 (trade name, manufactured by Sumika Polycarbonate Limited, viscosity average molecular weight: 21000)

(b) Polyester
  Polybutylene terephthalate (PBT): TORAYCON 1401 X06 (trade name, manufactured by TORAY INDUSTRIES, INC., intrinsic viscosity: 1.74)
  Polyethylene terephthalate (PET): VYLOPET EMC-500 (trade name, manufactured by TOYOBO CO., LTD., intrinsic viscosity: 0.69)

(c) Polymer having epoxy group
  E-GMA-1: BONDFAST E (trade name, manufactured by Sumitomo Chemical Company, Limited, copolymer of 88 parts by mass of ethylene and 12 parts by mass of glycidyl methacrylate)

E-GMA-2: BONDFAST 7M (trade name, manufactured by Sumitomo Chemical Company, Limited, copolymer of 67 parts by mass of ethylene, 6 parts by mass of glycidyl methacrylate, and 27 parts by mass of methyl acrylate)

(d) Ethylene-based polymer

EOR: Engage 8842 (trade name, manufactured by The Dow Chemical Company, ethylene-octene-1 copolymer, density: 0.857 g/cm$^3$)

(Others)

Methacrylate-butadiene-styrene copolymer (MBS): Kane Ace M570 (trade name, manufactured by KANEKA CORPORATION)

2. Polycarbonate Resin Composition and Molded Body

Example 1

A homodirectional twin-screw kneading extruder (KZW20TW, manufactured by TECHNOVEL CORPORATION) having a main feeder, a sub-feeder, and a nozzle head provided on the extruder side. This twin-screw kneading extruder has nine barrels C1 to C9 provided along the direction of extrusion from the hopper side. The temperatures of the respective barrels were set as follows.

C1: 100° C.
C2: 260° C.
C3 to C9: 280° ° C.

Into a hopper port provided in barrel C1 of the twin-screw kneading extruder, 100 parts by mass of PC was introduced from the main feeder, and 10 parts by mass of E-GMA-1 and 1.1 parts by mass of PBT were introduced from the sub-feeder. The temperature of the nozzle head was set to 280° C., the speed of rotation of the screws was set to 300 rpm, and the discharge amount was set to 5 kg/hour. PC, E-GMA-1, and PBT were melt-kneaded. The melt-kneading product discharged from the twin-screw extruder was cut with a pelletizer, and thereby a polycarbonate resin composition in a pellet form was obtained.

The polycarbonate resin composition in a pellet form thus obtained was molded by injection molding using an injection molding machine (manufactured by The Japan Steel Works, Ltd., J150EV-C5) under the conditions of a mold temperature of 90° C., a cylinder temperature of 300° C., and an injection speed of 20 mm/second, and thereby a molded body having a thickness of 3.2 mm was produced.

Examples 2 to 4

Polycarbonate resin compositions in a pellet form and molded bodies were produced under the same conditions as in Example 1, except that the incorporation amount ratio of E-GMA-1 and PBT were changed as indicated in Table 1.

Example 5

A resin composition in a pellet form and a molded body were produced under the same conditions as in Example 1, except that E-GMA-1 was changed to E-GMA-2.

Comparative Example 1

PC alone was molded under the same conditions as in Example 1, and a molded body was produced.

Comparative Examples 2 to 5

A polycarbonate resin composition in a pellet form and a molded body were produced under the same conditions as in Example 1, except that the incorporation amount ratio of E-GMA-1 and PBT were changed as indicated in Table 1.

Comparative Example 6

Into a hopper port provided in barrel C1 of the twin-screw kneading extruder, 100 parts by mass of PC was introduced from the main feeder, and 11.1 parts by mass of MBS was introduced from the sub-feeder. Under the same conditions as in Example 1 except for this, a polycarbonate resin composition in a pellet form was produced. A molded body was produced under the same conditions as in Example 1, using the polycarbonate resin composition thus obtained.

Example 6

Into a hopper port provided in barrel C1 of the twin-screw kneading extruder, 100 parts by mass of PC was introduced from the main feeder, and 4.4 parts by mass of E-GMA-1, 1.1 parts by mass of PBT, and 5.6 parts by mass of EOR were introduced from the sub-feeder. Under the same conditions as in Example 1 except for this, a polycarbonate resin composition in a pellet form was produced. A molded body was produced under the same conditions as in Example 1, using the polycarbonate resin composition thus obtained.

Examples 7 to 10 and Comparative Examples 7 to 10

Polycarbonate resin compositions in a pellet form and molded bodies were produced under the same conditions as in Example 6, except that the incorporation amount ratio of E-GMA-1, PBT, and EOR was changed as indicated in Table 2.

3. Evaluation

Izod Impact Test

From each of the molded bodies, a notched specimen having a length of 63.5 mm, a width of 12.7 mm, and a thickness of 3.2 mm was produced. Using this specimen, the Izod impact strength (kJ/m$^2$) was measured by an Izod impact test according to ASTM D-256. The Izod impact test was carried out in an atmosphere at 23°C and a specimen temperature of −40° C.

Tensile Test

From each of the molded bodies, a specimen for tensile test according to ASTM-D638 Type 1 was produced. A tensile test using this specimen was carried out in an atmosphere at 23° C. at a tensile rate of 1 mm/min, and the tensile modulus was measured.

Scratch Restorability

A polycarbonate resin composition in a pellet form obtained by twin-screw extrusion and kneading was subjected to pressure molding using a vacuum pressing machine under the conditions of a molding temperature of 260° C. and a pressure of 10 MPa, and thereby a molded body having a thickness of 2 mm was produced. On the surface of the molded body thus obtained, a scratch having a length of 30 mm was formed with a scratching needle (tip made of sapphire) according to JIS K6718. Scratching was carried out using HEIDON-14S under the conditions of a load of 200 gf and a speed of 200 mm/minute. The depth D1 of the scratch on the day of forming the scratch and the depth D2 of the scratch after leaving the molded body for one week were measured with a contact type surface roughness meter. Scratch restorability was evaluated based on the value of D1-D2 (amount of restoration). When this amount of restoration is large, it is implied that the restoring force at the time when the molded body has been scratched is high, that is, the scratch restorability is excellent.

Hydrolysis Resistance

A polycarbonate resin composition in a pellet form obtained by twin-screw extrusion and kneading was stored for 72 hours using a pressure cooker (manufactured by ESPEC CORP., EHS-221(M)) under the conditions of a test temperature of 120° C. and a humidity of 100% RH. The melt flow indices (MFR) of the pellet before storage and after storage were measured using a melt flow tester. The melt flow indices were measured under the conditions of a temperature of 280° ° C. and a load of 2.16 kgf. The presence or absence of an increase in the MFR of the pellet after storage by the pressure cooker with respect to the MFR of the pellet before storage, and the rate of increase of the MFR were measured. When an increase in the MFR is not recognized, or the rate of increase is small, it can be said that the polycarbonate resin composition has excellent hydrolysis resistance.

In Table 1 and Table 2, the incorporation amount ratios (parts by mass) of the various polycarbonate resin compositions and the evaluation results are presented. As shown in these tables, the polycarbonate resin compositions of the various Examples containing an aromatic polycarbonate as a main component satisfy the requirements that the content of the aromatic polycarbonate ((a)/total) is 75% by mass or more, the mass ratio ((C)/(b)) of the content of the polymer having an epoxy group with respect to the content of the polyester is 0.8 or more, and the content of the sum ((b)+(c)) of the polyester and the polymer having an epoxy group is 25 parts by mass or less with respect to 100 parts by mass of the aromatic polycarbonate. It was verified that the polycarbonate resin compositions of the various Examples exhibit excellent characteristics in terms of impact resistance, scratch restorability, and hydrolysis resistance while maintaining a relatively high elastic modulus.

TABLE 1

|   |   | Example | | | | | Comparative Example | | | | | |
|---|---|---|---|---|---|---|---|---|---|---|---|---|
|   |   | 1 | 2 | 3 | 4 | 5 | 1 | 2 | 3 | 4 | 5 | 6 |
| (a) | PC | 100 | 100 | 100 | 100 | 100 | 100 | 100 | 100 | 100 | 100 | 100 |
| (b) | PBT | 1.1 | 2.5 | 5 | 5 | 1.1 |  |  | 1.1 | 1.25 | 15 |  |
| (c) | E-GMA-1 | 10 | 7.5 | 15 | 5 |  |  | 11.1 |  | 2.5 | 45 |  |
|   | E-GMA-2 |  |  |  |  | 10 |  |  |  |  |  |  |
| (d) | EOR |  |  |  |  |  |  |  |  |  |  |  |
|   | MBS |  |  |  |  |  |  |  |  |  |  | 11.1 |
| (c)/(b) (mass ratio) |   | 9.1 | 3.0 | 3.0 | 1.0 | 9.1 | — | — | 0.0 | 0.5 | 3.0 | — |
| (b) + (c) (parts by mass) |   | 11.1 | 10.0 | 20.0 | 10.0 | 11.1 | 0.0 | 11.1 | 1.1 | 3.75 | 60.0 | 0.0 |
| (a)/total (wt. %) |   | 90 | 91 | 83 | 91 | 90 | 100 | 90 | 99 | 96 | 63 | 90 |
| Izod (KJ/m$^2$) |   | 16.3 | 16.1 | 16.5 | 11.5 | 15.5 | 10.8 | 8.1 | 8.0 | 9.0 | 15.6 | 22.5 |
| Tensile modulus (MPa) |   | 1900 | 2030 | 1850 | 2130 | 2000 | 2280 | 1920 | 2240 | 2240 | 1250 | 1990 |
| Scratch restorability (amount of restoration, μm) |   | 0.40 | 0.38 | 0.56 | 0.51 | 0.58 | 0.14 | 0.76 | 0.12 | 0.23 | 0.7 | 0.49 |
| Hydrolysis resistance (rate of increase in MFR) |   | Absent | Absent | Absent | Present (14.2%) | Present (6.9%) | Present (49.5%) | Absent | Present (54.6%) | Present (29.6%) | Absent | Present (25.7%) |

TABLE 2

|   |   | Example | | | | | Comparative Example | | | |
|---|---|---|---|---|---|---|---|---|---|---|
|   |   | 6 | 7 | 8 | 9 | 10 | 7 | 8 | 9 | 10 |
| (a) | PC | 100 | 100 | 100 | 100 | 100 | 100 | 100 | 100 | 100 |
| (b) | PBT | 1.1 | 1.1 | 1.1 | 5 |  |  | 1.1 | 1.1 | 15 |
|   | PET |  |  |  |  | 1.1 |  |  |  |  |
| (c) | E-GMA-1 | 4.4 | 1.1 | 4.4 | 15 | 4.4 |  |  | 0.5 | 45 |
|   | E-GMA-2 |  |  |  |  |  |  |  |  |  |
| (d) | EOR | 5.6 | 5.6 | 20 | 5.6 | 5.6 | 11.1 | 10 | 5.6 | 5.6 |
|   | MBS |  |  |  |  |  |  |  |  |  |
| (c)/(b) (mass ratio) |   | 4.0 | 1.0 | 4.0 | 3.0 | 4.0 | — | 0.00 | 0.45 | 3.00 |
| (b) + (c) (parts by mass) |   | 5.5 | 2.2 | 5.5 | 20.0 | 4.4 | 0.0 | 1.1 | 1.6 | 60.0 |
| (a)/total (wt. %) |   | 90 | 93 | 80 | 80 | 90 | 90 | 90 | 93 | 60 |
| Izod (kJ/m$^2$) |   | 21.2 | 41.4 | 68.4 | 50.1 | 16.3 | 14.3 | 12.7 | 32.1 | 18.3 |
| Tensile modulus (MPa) |   | 1980 | 2010 | 1580 | 1700 | 1860 | 1930 | 1950 | 1990 | 1240 |
| Scratch restorability (amount of restoration, μm) |   | 0.36 | 0.42 | 0.54 | 0.48 | 0.35 | 0.37 | 0.39 | 0.26 | 0.26 |
| Hydrolysis resistance (rate of increase in MFR) |   | Absent | Present (3.8%) | Absent | Absent | Present (13.2%) | Present (19.3%) | Present (35.1%) | Present (19.0%) | Absent |

REFERENCE SIGNS LIST

1: molded body.

The invention claimed is:

1. A polycarbonate resin composition, comprising:
(a) an aromatic polycarbonate;
(b) a polyester comprising polybutylene terephthalate; and
(c) a polymer having an epoxy group,
wherein the polycarbonate resin composition satisfies the following requirements:
(1) a content of the (a) aromatic polycarbonate is 80% by mass or more and 98% by mass or less based on a mass of the polycarbonate resin composition;
(2) a mass ratio of a content of the (c) polymer having an epoxy group with respect to a content of the (b) polyester is more than 3.0 and 9.1 or less; and
(3) a content of a sum of the (b) polyester and the (c) polymer having an epoxy group is 5.5 parts by mass or more and 20 parts by mass or less with respect to 100 parts by mass of the (a) aromatic polycarbonate;
wherein a proportion of a monomer unit having an epoxy group is more than 6% by mass based on a mass of the polymer having an epoxy group, and the polymer having an epoxy group is an ethylene-glycidyl (meth) acrylate copolymer.

2. The polycarbonate resin composition according to claim 1, further containing (d) an ethylene-based polymer.

3. The polycarbonate resin composition according to claim 2, wherein a density of the (d) ethylene-based polymer is less than 0.930 g/cm$^3$.

4. A molded body comprising the polycarbonate resin composition according to claim 1.

* * * * *